(12) United States Patent
Lin

(10) Patent No.: US 6,442,113 B2
(45) Date of Patent: Aug. 27, 2002

(54) DEVICE AND METHOD FOR FOCUSING ON OPTICAL DISK

(75) Inventor: Meng-Fu Lin, Kaohsiung (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/783,458

(22) Filed: Feb. 14, 2001

(30) Foreign Application Priority Data

Feb. 16, 2000 (TW) .......................................... 89102591

(51) Int. Cl.$^7$ ................................................ G11B 7/00

(52) U.S. Cl. .................................. 369/44.35; 369/53.28

(58) Field of Search ............................ 369/44.12, 44.25, 369/44.27, 44.29, 44.32, 44.35, 47.36, 47.38, 47.39, 47.45, 53.23, 53.28, 53.3

(56) References Cited

U.S. PATENT DOCUMENTS 5,642,340 A * 6/1997 Nomura .................... 369/44.29
5,852,592 A * 12/1998 Braat ....................... 369/44.12

* cited by examiner

*Primary Examiner*—Paul W. Huber
(74) *Attorney, Agent, or Firm*—J.C. Patents

(57) ABSTRACT

A device for finding the focus between an optical pickup head and an optical disk by tapping signals from a radio frequency amplifier comprises a high-pass filter for receiving a focus error signal from the radio frequency amplifier and generating a focus error high-pass signal; and a decision circuit that couples to the high-pass filter for receiving the focus error high-pass signal and using a focus zero cross level as a reference for determining a correct focusing point. The focus between the optical pickup head and the optical disk is found when the focus error high-pass signal reaches the positive focus zero cross level or the focus error high-pass signal reaches the negative focus zero cross level.

12 Claims, 4 Drawing Sheets

DEVICE AND METHOD FOR FOCUSING ON OPTICAL DISK

CROSS-REFERENCE TO RELATED APPLICATION

This application claims the priority benefit of Taiwan application serial no. 89102591, filed Feb. 16, 2000.

BACKGROUND OF THE INVENTION

1. Field of the Invention

The present invention relates to a device and method applied in an optical storage device for focusing on an optical disk. More particularly, the present invention relates to a device and method capable of finding a focus on an optical disk by utilizing a high-pass filter and a focus zero cross level.

2. Description of Related Art

FIG. 1A is a schematic side view of a pickup head and a disk in an optical storage device. An optical disk 10 is placed inside an optical disk tray. A motor (not shown) drives the optical disk 10 driven into rotation (not shown). Meanwhile, a pickup head 20 moves towards the disk surface in search for a focus. After the pickup head 20 has properly focused on the disk surface, data is read from the optical disk 10. The optical storage device has a radio frequency amplifier (RF Amp.) for sending out a focus error (FE) signal. The focus error signal serves to decide whether the pickup head 20 is in focus or not.

FIG. 1B is a graph showing the variation of focus error signal sensed by the radio frequency amplifier when the pickup head approaches the optical disk shown in FIG. 1A. As the pickup head 20 approaches the optical disk 10, the radio frequency amplifier generates an S-curve in the neighborhood region of the focus. As shown in FIG. 1B, the focus error signal rises from zero to a peak when the head 20 moves close to the optical disc 10. Then the focus error signal drops rapidly passing through a zero mark and reaches a bottom value (this region is a linear section). Finally, the focus error signal bounces back from the bottom to almost zero if the pickup head 20 still approaches the optical disk 10. Focus for the pickup head 20 is located at the position where the focus error signal in the linear section is zero.

FIG. 1C is a graph showing the variation of focus error signal sensed by the radio frequency amplifier when the pickup head moves away from the optical disk. Similarly, when the pickup head 20 moves away from the optical disk 10 from a close distance, the radio frequency amplifier generates an S-curve in the neighborhood of the focus. As shown in FIG. 1C, the focus error signal drops from zero to a bottom when the optical head 20 moves away from the optical disk 10. Then, the focus error signal rises rapidly passing through a zero mark and reaches a peak (this region is a linear section). Finally, the focus error signal drops again from the peak value to almost zero when the pickup head 20 still moves far away from the optical disk 10. Focus for the pickup head 20 is located at the position where the focus error signal in the linear section is zero.

Ideally, the aforementioned method is capable of finding a proper focus for the pickup head. However, the optical disk is likely to wobble in rotation. Consequently, the focus error signal will be incomplete and position of the actual focus will be difficult to determine.

FIGS. 2A and 2B are graphs showing incompleteness in tracing out the frequency error signal when the pickup head approaches a wobbly optical disk. In FIG. 2A, focus error signal starts to drop before reaching a peak. Instead of a rapid drop, the drop in focus error signal is slow. Moreover, there is no further drop as soon as the focus error signal reaches zero. In FIG. 2B, focus error signal also drop before reaching a peak. However, there is another rise and fall after the first one. Under both conditions shown in FIGS. 2A and 2B, the optical system will regard the point having zero focus error value as the focus. Hence, the pickup head may be out of focus and data read from the optical disk may be in error.

In addition, the focus error signal generated by the radio frequency amplifier may also produce a shift in DC level. Due to a shift in the DC level, position of zero point in the trace for focus error signal may be incorrectly determined and may result in improper focusing.

To combat the above problems, a high-pass filter (HPF) is normally added to a conventional optical storage device. Since the main function of a high-pass filter is to filter out the DC level component within focus error signal, the high-pass filter has a cutoff frequency greater than zero. The high-pass filter is also capable of producing a focus error high-pass filter (FE-HPF) signal and providing a focus on level (FONL) for comparing with the focus error high-pass filter signal. After the focus error high-pass filter signal is higher and then lower than the FONL signal, position where the FE-HPF signal reaches zero again is the focus of the pickup head.

Although the introduction of a high-pass filter to a conventional system solves some error focusing, errors in focusing still happens. FIGS. 3A, 3B and 3C show error waveforms generated in searching a focus on the optical disk. In FIG. 3A, a normal focus error high-pass filter signal is shown. The zero point in the linear section of the graph is a correct focus for the pickup head. In FIG. 3B, the graph of an abnormal focus error high-pass filter signal is shown. Since this abnormal FE-BPF signal is not higher than the FONL signal, erroneous focusing will not occur. In FIG. 3C, another abnormal focus error high-pass filter signal is shown. However, because the focus error high-pass filter signal is higher and then lower than the FONL signal, and drops back to zero level, the zero-crossing position will be interpreted as a proper focus for the pickup head leading to possible data-reading errors.

SUMMARY OF THE INVENTION

Accordingly, one object of the present invention is to provide an installation and method for focusing on an optical disk. The method includes passing a focus error signal through a high-pass filter to generate a focus error high-pass signal in addition to providing a focus on level. The criterion for finding the focus on the optical disk is the observation that the focus error high-pass signal has reached the focus on level.

A second object of this invention is to provide a device and method capable of finding the correct focus between an optical disk and a pickup head so that improper focusing is prevented.

To achieve these and other advantages and in accordance with the purpose of the invention, as embodied and broadly described herein, the invention provides an installation for finding a correct focusing distance to an optical disk. A device for finding the focus between an optical pickup head and an optical disk by tapping signals from a radio frequency amplifier comprises a high-pass filter for receiving a focus error signal from the radio frequency amplifier and generating a focus error high-pass signal; and a decision circuit that couples to the high-pass filter for receiving the focus error high-pass signal and using a focus zero cross level as a reference for determining a correct focusing point. The focus between the optical pickup head and the optical disk is found when the focus error high-pass signal reaches the positive focus zero cross level or the focus error high-pass signal reaches the negative focus zero cross level.

The invention also provides a device for finding the focus between an optical pickup head and an optical disk by tapping signals from a radio frequency amplifier. A high-pass filter for receiving a focus error signal from the radio frequency amplifier and generating a focus error high-pass signal; and a decision circuit. The decision circuit further comprises a subtraction unit for subtracting the focus zero cross level from the focus error high-pass signal and outputs the result of the subtraction; an adder unit for adding the focus zero cross level to the focus error high-pass signal and outputs the result of the addition, and a control circuit for monitoring the results from the subtraction unit and the adder unit so that the correct focus point is found when output from either the subtraction unit or the adder unit is zero.

This invention also provides a method for finding the focus between an optical pickup head and an optical disk. First, a focus error signal is provided from the pickup head/optical disk system. A high-pass filtering on the focus error signal is performed to produce a focus error high-pass signal. A focus zero cross level signal is further provided. Finally, the focus point is captured when the value obtained by subtracting the focus zero level from the focus error high-pass signal or adding the focus zero level to the focus error high-pass signal is zero.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
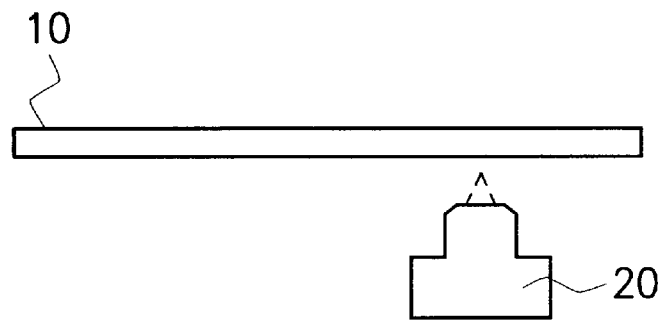
FIG. 1A is a schematic side view of a pickup head and a disk in an optical system.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
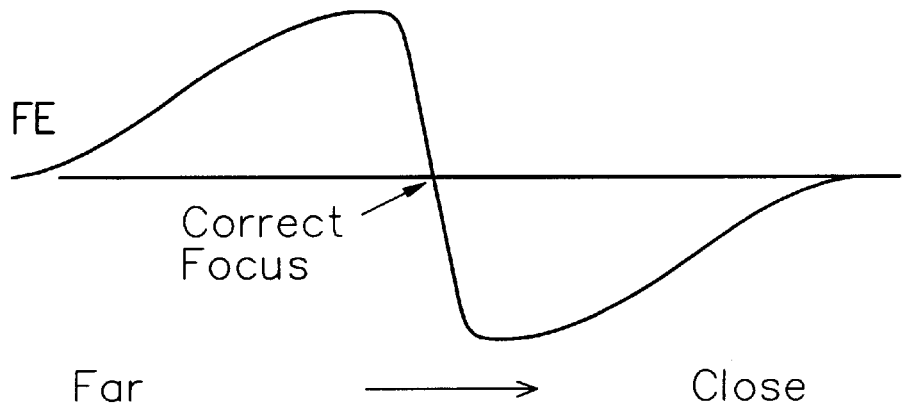
FIG. 1B is a graph showing the variation of focus error signal sensed by the radio frequency amplifier when the pickup head approaches the optical disk shown in FIG. 1A.
Figure 1C:
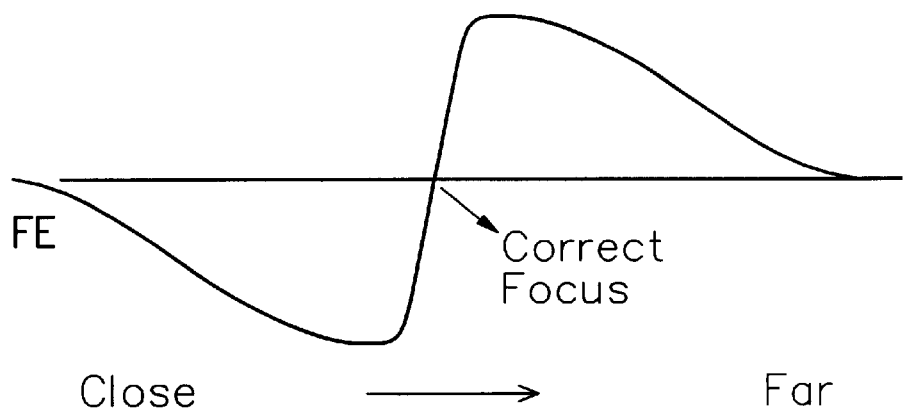
FIG. 1C is a graph showing the variation of focus error signal sensed by the radio frequency amplifier when the pickup head moves away from the optical disk.
Figure 2A:
FIGS. 2A and 2B are graphs showing incompleteness in tracing out the focus error signal when the pickup head approaches a wobbly optical disk.
Figure 2B:
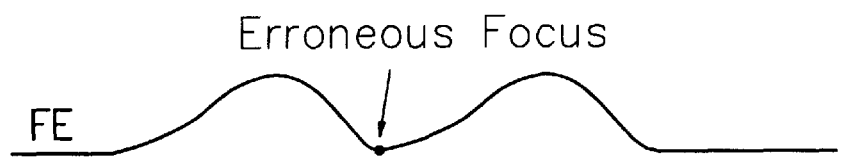
Figure 3A:
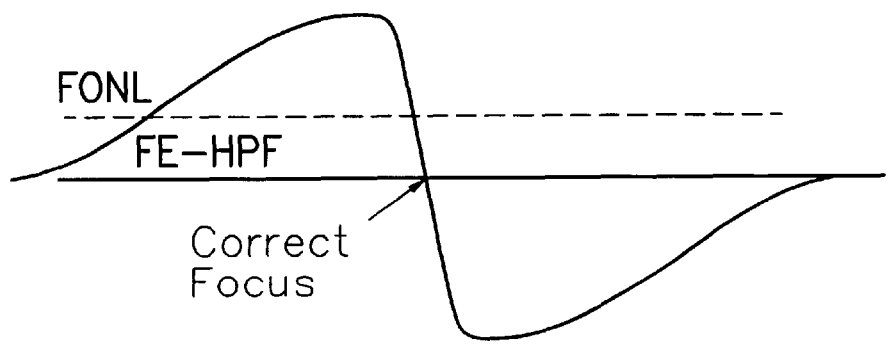
FIGS. 3A, 3B and 3C show error waveforms generated in search of a focus on the optical disk.
Figure 3B:
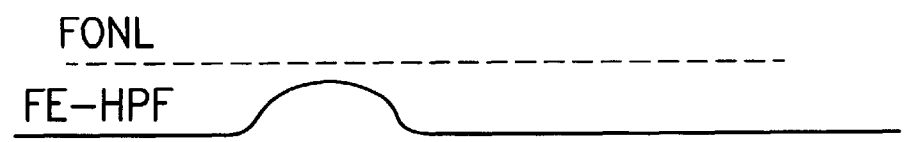
Figure 3C:
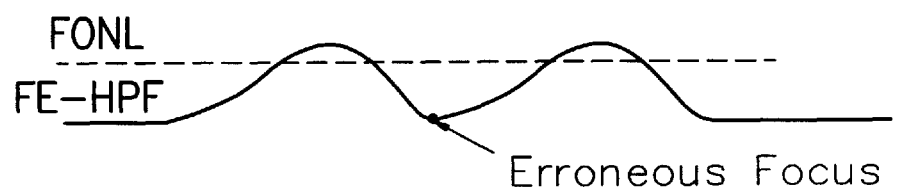

The device and method of this invention for finding the focus on an optical disk is based on the characteristics of focus error signal. As shown in FIGS. 1B and 1C, the linear section in the graphs are a rapidly rising region or dropping region respectively. According to the results of spectrum analysis, the linear sections contain the highest frequencies in the entire signal bandwidth.

Hence, according to the special frequency characteristics, this invention provides a high-pass filter with a cutoff frequency as the lowest frequency inside the linear section, In addition, after the generation of the high-pass filter signal, a focus zero cross level is provided to search for the correct focusing distance between the optical pickup head and the optical disk.

Figure 4A:
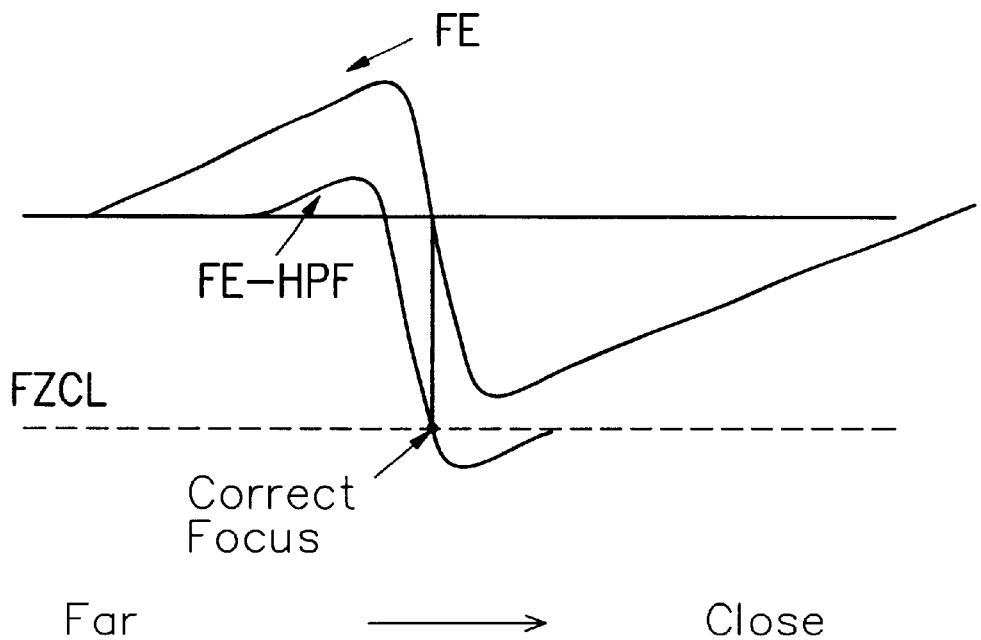
FIGS. 4A and 4B are graphs showing two types of focus error signals and focus error high-pass signals according to the invention.
Figure 4B:
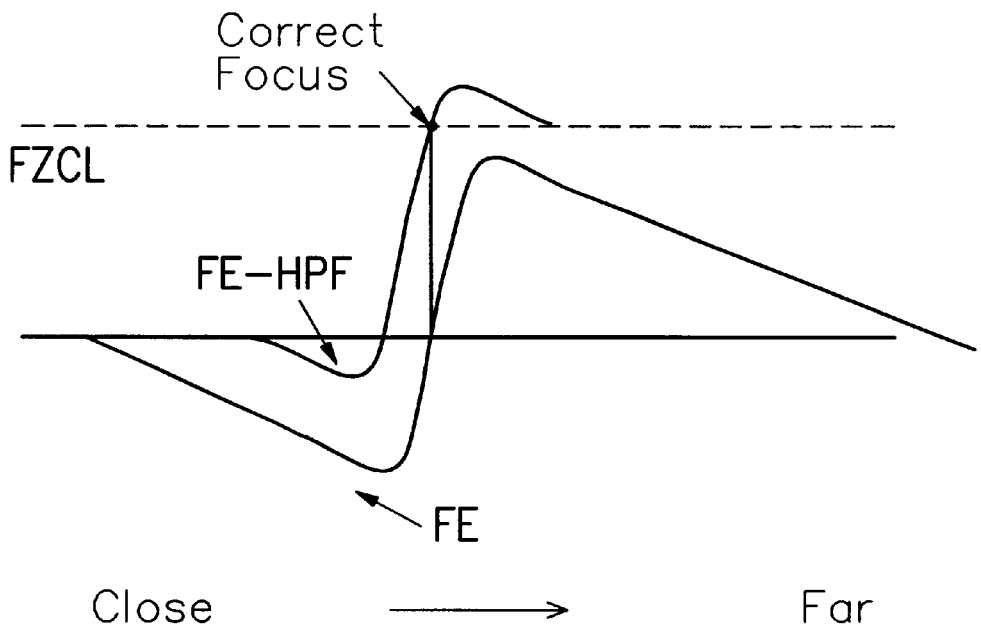

FIGS. 4A and 4B are graphs showing two types of focus error signals and focus error high-pass signals. In FIG. 4A, since the cutoff frequency for the high frequency filter is high, the rising focus error signal is attenuated and only the FE signal within the linear section is entirely output. Hence, the entire focus error high-pass signal is pulled down to negative and asymmetric as well.

Similarly in FIG. 4B, since the cutoff frequency for the high frequency filter is high, the falling the focus error signal is attenuated and only the FE signal within the linear section is entirely output. Hence, the entire focus error high-pass signal is pulled up to positive and asymmetric as well.

In addition, a focus zero cross level (FZCL) signal is also provided. When the focus error high-pass signal reaches the level, the correct focusing distance between an optical pickup head and an optical disk is determined.

Figure 5A:
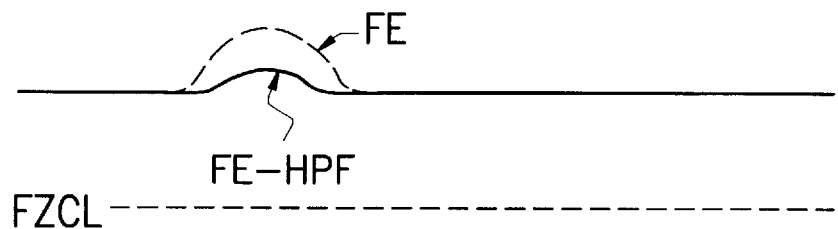
FIGS. 5A and 5B are graphs showing incomplete focus error signal as an optical pickup head approaches an optical disk and corresponding focus error high-pass signal after passing through a high-pass filter.
Figure 5B:
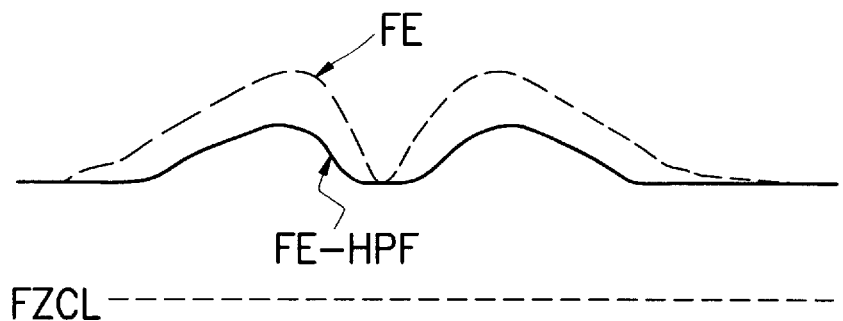

FIGS. 5A and 5B show incomplete focus error signal and corresponding focus error high-pass signal as an optical pickup head approaches an optical disk. As shown in FIGS. 5A and 5B, most of the high frequency components in the focus error signal disappear. Hence, almost all the signals are attenuated so that it is impossible for the focus error high-pass signal to reach the focus zero cross level. In other words, this invention precludes the finding of a focus between the optical pickup head and the disk under these two circumstances.

Figure 6:
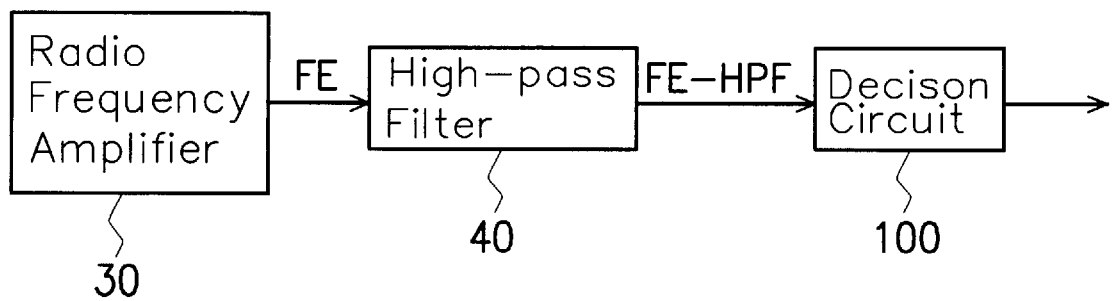
FIG. 6 is a circuit diagram showing the installation for finding the correct focus on an optical disk according to a preferred embodiment of this invention.

FIG. 6 is a circuit diagram showing the device for finding the correct focus between an optical disk and an optical pickup head according to this invention. A radio frequency amplifier 30 sends out a focus error signal to a high-pass filter 40, and the high-pass filter 40 in turn sends out a focus error high-pass signal to a decision circuit 100. The decision circuit 100 provides a focus zero cross level (FZCL) signal for determining a proper focus between the pickup head and the optical disk.

Figure 7:
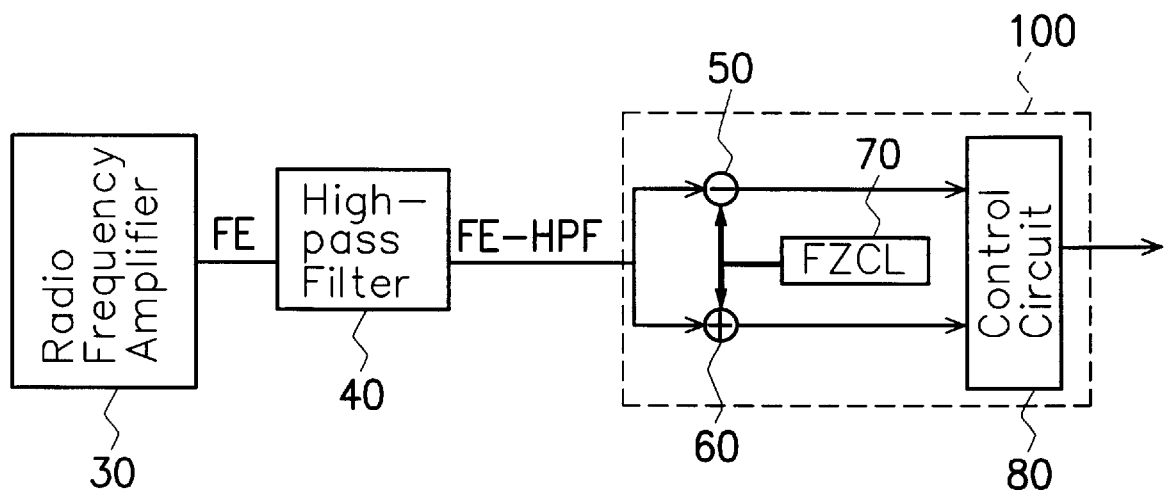
FIG. 7 is a circuit diagram showing the decision circuit in FIG. 6.

FIG. 7 is a circuit diagram showing the decision circuit in FIG. 6. The decision circuit 100 comprises a subtraction unit 50, an adder unit 60, a focus zero cross level provider 70 and a controller 80. The radio frequency amplifier 30 outputs a focus error signal to the high-pass filter 40. The high-pass filter 40 in turn outputs a focus error high-pass signal to a subtraction unit 50 and an adder unit 60 inside the decision circuit 100. An internal focus zero cross level provider 70 also inputs a focus zero cross level into the subtraction unit 50 and the adder unit 60 respectively. When a zero value is picked up by a controller 80 from either the subtraction unit 50 or the adder unit 60, the correct focus between the optical pickup head and the optical disk is found.

When an optical pickup head moves away from an optical disk, the focus error signal falls and then rises. Hence, after passing through the high-pass filter 40, the focus error high-pass signal within the linear section is raised to positive values. At this stage, the focus zero cross level 70 needs to be subtracted from the focus error high-pass signal and indicates a correct focus when the output from the subtraction unit 50 is zero. The focus zero cross level is the focus error high-pass signal when the focus error signal is zero-crossing. Hence, the value obtained after subtracting the focus zero cross level from the focus error high-pass signal is zero when the focus error signal is zero.

When an optical pickup head moves towards an optical disk, the focus error signal rises and then falls. Hence, after passing through the high-pass filter 40, focus error high-pass signal within the linear section is pulled down to negative values. At this stage, the focus zero cross level 70 needs to be added to the focus error high-pass signal and indicates a correct focus when the output from the adder unit 60 is zero. The focus zero cross level is the focus error high-pass signal when the focus error signal is zero-crossing. Hence, the value obtained after adding the focus zero cross level to the focus error high-pass signal is zero when the focus error signal is zero.

In summary, this invention provides a device and a method for finding the correct focus relative to an optical disk. The focus error signal is passed to a high-pass filter to generate a focus error high-pass signal. A focus zero cross level is provided so that the correct focus is found when the focus error high-pass signal reaches the focus zero cross level. Hence, a proper focus can be found quickly and efficiently, thereby preventing input of erroneous data when the pickup head is improperly focused.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A device, applied in an optical storage device, for finding the focus between an optical pickup head and an optical disk, comprising:
    a high-pass filter for receiving a focus error signal and generating a focus error high-pass signal based on a cutoff frequency thereof; and
    a decision circuit that couples to the high-pass filter for receiving the focus error high-pass signal and using a focus zero cross level for determining a correct focusing point, wherein
    the focus between the optical pickup head and the optical disk is found when the focus error high-pass signal reaches the positive focus zero cross level or the focus error high-pass signal reaches the negative focus zero cross level.

2. The device of claim 1, wherein the decision circuit further comprises:
    a subtraction unit for subtracting the focus zero cross level from the focus error high-pass signal and outputs the result of the subtraction;
    an adder unit for adding the focus zero cross level to the focus error high-pass signal and outputs the result of the addition; and
    a control circuit for monitoring the results from the subtraction unit and the adder unit so that the correct focus point is found when output from either the subtraction unit or the adder unit is zero.

3. The device of claim 1, wherein the cutoff frequency of the high-pass filter is in a linear section of the high-pass filter.

4. The device of claim 1, wherein the focus zero cross level signal is focus error high-pass signal when the focus error signal is zero crossing.

5. The device of claim 2, wherein the decision circuit further comprises a focus zero cross level provider to provide the focus zero cross level.

6. A device, applied in an optical storage device, for finding the focus between an optical pickup head and an optical disk, comprising:
    a high-pass filter for receiving a focus error signal from the radio frequency amplifier and generating a focus error high-pass signal based on a cutoff frequency thereof; and
    a decision circuit, comprising:
        subtraction unit for subtracting a focus zero cross level signal from the focus error high-pass signal and outputs the result of the subtraction;
        an adder unit for adding the focus zero cross level signal to the focus error high-pass signal and outputs the result of the addition, and
        a control circuit for monitoring the results from the subtraction unit and the adder unit so that the correct focus point is found when output from either the subtraction unit or the adder unit is zero.

7. The device of claim 6, wherein the cutoff frequency of the high-pass filter is in a linear section of the high-pass filter.

8. The device of claim 6, wherein the focus zero cross level signal is focus error high-pass signal when the focus error signal is zero crossing.

9. The device of claim 6, wherein the decision circuit further comprises a focus zero cross level provider to provide the focus zero cross level.

10. The method for finding the focus between an optical pickup head and an optical disk, comprising the steps of:
    providing a focus error signal from the pickup head/optical disk system;
    performing a high-pass filtering on the focus error signal to produce a focus error high-pass signal;
    providing a focus zero cross level signal; and
    capturing the focus point when the value obtained by subtracting the focus zero level from the focus error high-pass signal or adding the focus zero level to the focus error high-pass signal is zero.

11. The method of claim 10, wherein the cuttoff frequency of the high-pass filter is determined by the frequency component in the linear section of a focus error signal.

12. The method of claim 10, wherein the focus zero cross level signal is focus error high-pass signal when the focus error signal is zero crossing.

* * * * *